(12) United States Patent
Park et al.

(10) Patent No.: US 9,863,503 B2
(45) Date of Patent: Jan. 9, 2018

(54) PLANETARY GEAR TRAIN OF AUTOMATIC TRANSMISSION FOR VEHICLES

(71) Applicant: Hyundai Motor Company, Seoul (KR)

(72) Inventors: JongSool Park, Hwaseong-si (KR); Dong Hwan Hwang, Seoul (KR); Seong Wook Hwang, Gunpo-si (KR); Seongwook Ji, Ansan-si (KR); Chang Wook Lee, Suwon-si (KR); Hyun Sik Kwon, Seoul (KR); SeokJin Kim, Hwaseong-si (KR); KyeongHun Lee, Seoul (KR); Wonmin Cho, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 158 days.

(21) Appl. No.: 14/948,265

(22) Filed: Nov. 21, 2015

(65) Prior Publication Data

US 2017/0074368 A1 Mar. 16, 2017

(30) Foreign Application Priority Data

Sep. 14, 2015 (KR) .......................... 10-2015-0129866

(51) Int. Cl.
*F16H 3/66* (2006.01)

(52) U.S. Cl.
CPC ....... *F16H 3/66* (2013.01); *F16H 2200/0065* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| 8,961,355 | B2 * | 2/2015 | Hart | .......................... F16H 3/66 475/275 |
| 9,291,245 | B2 | 3/2016 | Takeuchi et al. | |
| 9,453,559 | B2 * | 9/2016 | Ji | .............................. F16H 3/66 |

FOREIGN PATENT DOCUMENTS

| EP | 2 792 906 A1 | 10/2014 |
| JP | 2014-500462 A | 1/2014 |
| KR | 10-2012-0132021 A | 12/2012 |

* cited by examiner

*Primary Examiner* — Jacob S Scott
(74) *Attorney, Agent, or Firm* — Morgan, Lewis & Bockius LLP

(57) ABSTRACT

A planetary gear train of an automatic transmission for a vehicle may include an input shaft receiving power of an engine, an output shaft configured to output shifted power, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, and six control elements which are disposed between the rotation elements, and disposed at portions where the rotation elements are selectively connected to a transmission housing.

9 Claims, 2 Drawing Sheets

FIG. 2

| Speed stages | Control elements | | | | | | Gear ratio | Ration between speed stages | Span of a gear ratio |
|---|---|---|---|---|---|---|---|---|---|
| | B1 | B2 | B3 | C1 | C2 | C3 | | | |
| D1 | | ● | ● | | | ● | 5.461 | - | 9.0 (Tuning available) |
| D2 | | | ● | | ● | ● | 3.430 | 1.645 | |
| D3 | | ● | ● | | ● | | 2.235 | 1.535 | |
| D4 | | ● | ● | ● | | | 1.599 | 1.398 | |
| D5 | | ● | | ● | ● | | 1.212 | 1.319 | |
| D6 | | | | ● | ● | ● | 1.000 | 1.212 | |
| D7 | | ● | | ● | | ● | 0.886 | 1.129 | |
| D8 | ● | ● | | ● | | | 0.754 | 1.175 | |
| D9 | ● | ● | | ● | | | 0.626 | 1.204 | |
| REV | ● | | ● | | | | -4.135 | - | - |

PLANETARY GEAR TRAIN OF AUTOMATIC TRANSMISSION FOR VEHICLES

CROSS-REFERENCE TO RELATED APPLICATION

The present application claims priority to Korean Patent Application No. 10-2015-0129866 filed Sep. 14, 2015, the entire contents of which is incorporated herein for all purposes by this reference.

BACKGROUND OF THE INVENTION

Field of the Invention

The present invention relates to an automatic transmission for a vehicle. More particularly, the present invention relates to that improves power delivery performance and fuel consumption and obtains a linearity between step ratios of transmission steps by enlarging a span of gear ratios while achieving nine forward speed stages using a minimum number of constituent elements.

Description of Related Art

The recent increase in oil prices pushed carmakers unlimited competition for enhancing fuel efficiency.

Accordingly, research is being conducted on engines in terms of reducing weight and improving fuel efficiency by down-sizing, and research is also being conducted for simultaneously securing operability and fuel efficiency competitiveness by implementing an automatic transmission with multiple speed stages.

However, in the case of the automatic transmission, the number of internal components is increased as the number of gear shift stages is increased, and as a result, the automatic transmission may be difficult to mount, the manufacturing cost and weight may be increased, and power transmission efficiency may be deteriorated.

Therefore, in order to increase an effect of improving fuel efficiency by implementing an automatic transmission with multiple speed stages, it is important to develop a planetary gear train capable of maximizing efficiency using a small number of components.

In this respect, recently, an eight-speed automatic transmission has been implemented, and research and development are being actively conducted on a planetary gear train that may implement gear shift stages for eight or more speeds.

However, in the case of the recent eight-speed automatic transmission, a span of a gear shift ratio is maintained at a level of 6.5 to 7.5, and as a result, there is a problem in that the recent eight-speed automatic transmission has no great effect of improving fuel efficiency.

In a case in which a span of a gear shift ratio in the eight-speed automatic transmission is increased to the level of 9.0 or more, because it is impossible to ensure linearity of step ratios between gear shift stages, driving efficiency of the engine and drivability of the vehicle deteriorate.

Accordingly, there is a need for development of a highly efficient automatic transmission with 9 or more forward speed stages.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle that improves power delivery performance and fuel efficiency and ensures linearity of step ratios between transmission steps by increasing a span of gear ratios while realizing at least nine forward speed or more stages and at least one reverse speed or more stage by using a minimum number of constituent elements.

According to various aspects of the present invention, a planetary gear train of an automatic transmission for a vehicle may include an input shaft receiving power of an engine, an output shaft configured to output shifted power, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, and six control elements which are disposed between the rotation elements, and disposed at portions where the rotation elements are selectively connected to a transmission housing, in which the input shaft may be continuously connected with the first rotation element, the output shaft may be continuously connected to the eleventh rotation element, the first rotation element may be continuously connected to the fifth rotation element, the third rotation element may be continuously connected to the eighth rotation element, the fourth rotation element may be continuously connected to the ninth rotation element, the fourth rotation element may be continuously connected to the tenth rotation element, the second rotation element may be selectively connected to the transmission housing, and while three control elements of the six control elements are operated, at least nine forward speed stages and at least one reverse speed stage may be implemented.

The seventh rotation element may be selectively connected to the transmission housing, the twelfth rotation element may be selectively connected to the transmission housing, the output shaft may be selectively connected to the sixth rotation element, the third rotation element may be selectively connected to the second rotation element, and the fourth rotation element may be selectively connected to the second rotation element.

The first, second, and third rotation elements of the first planetary gear set may be a sun gear, a planetary carrier, and a ring gear, respectively, the fourth, fifth, and sixth rotation elements may be a sun gear, a planetary carrier, and a ring gear, the seventh, eighth, and ninth rotation elements may be a sun gear, a planetary carrier, and a ring gear, respectively, and the tenth, eleventh, and twelfth rotation elements may be a sun gear, a planetary carrier, and a ring gear, respectively.

According to various aspects of the present invention, a planetary gear train of an automatic transmission for vehicles may include an input shaft receiving power of an engine, an output shaft configured to output shifted power, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, six control elements disposed at positions selectively connecting the rotation elements to each other or at positions selectively connecting the rotation elements and the transmission housing, a first rotating shaft including the first rotation element and the fifth rotation element and directly connected to the input shaft to be continuously operated as an input element, a second rotating shaft including the second rotation element and selectively connected to the transmission housing, a third rotating shaft including the third rotation element and the eighth rotation element and selectively connected to the second rotating shaft, a fourth rotating shaft including the fourth rotation element, the ninth rotation element, and the tenth rotation element and selectively connected to the second rotating shaft, a fifth rotating shaft including the sixth rotation element, a sixth rotating shaft including the seventh rotation element and selectively connected to the transmission housing, a seventh rotating shaft including the eleventh rotation element and selectively connected to the fifth rotating shaft and simultaneously and directly connected to the output shaft, and an eighth rotating shaft including the twelfth rotation element and selectively connected to the transmission housing.

The first planetary gear set may be a single-pinion planetary gear set, in which the first rotation element is a first sun gear, the second rotation element is a first planet carrier, and the third rotation element is a first ring gear, the second planetary gear set may be a single-pinion planetary gear set, in which the fourth rotation element is a second sun gear, the fifth rotation element is a second planet carrier, and the sixth rotation element is a second ring gear, the third planetary gear set may be a single-pinion planetary gear set, in which the seventh rotation element is a third sun gear, the eighth rotation element is a third planet carrier, and the ninth rotation element is a third ring gear, and, the fourth planetary gear set may be a single-pinion planetary gear set, the tenth rotation element is a fourth sun gear, the eleventh rotation element is a fourth planet carrier, and the twelfth rotation element is a fourth ring gear.

The six control elements may include a first clutch selectively connecting the fifth rotating shaft and the seventh rotating shaft, a second clutch selectively connecting the second rotating shaft and the third rotating shaft, a third clutch selectively connecting the second rotating shaft and the fourth rotating shaft, a first brake selectively connecting the second rotating shaft and the transmission housing, a second brake selectively connecting the sixth rotating shaft and the transmission housing, and a third brake selectively connecting the eighth rotating shaft and the transmission housing.

Speed stages realized by selective operation of the six control elements may include a first forward speed stage by the simultaneous operation of the third clutch and the second, third brake, a second forward speed stage by the simultaneous operation of the second and third clutches and the third brake, a third forward speed stage by the simultaneous operation of the second clutch and the second and third brakes, a fourth forward speed stage by the simultaneous operation of the first clutch and the second and third brakes, a fifth forward speed stage by the simultaneous operation of the first and second clutches and the second brake, a sixth forward speed stage by the simultaneous operation of the first, second, and third clutches, a seventh forward speed stage by the simultaneous operation of the first and third clutches and the second brake, an eighth forward speed stage by the simultaneous operation of the first and third clutches and the first brake, a ninth forward speed stage by the simultaneous operation of the first clutch and the first and second brakes, and a reverse speed stage by the simultaneous operation of the first, second, and third brakes.

According to various aspects of the present invention, a planetary gear train of an automatic transmission for vehicles may include an input shaft receiving power of an engine, an output shaft configured to output shifted power, a first planetary gear set comprising a single pinion planetary gear set and including a first, second, and third rotation elements, a second planetary gear set comprising a single pinion planetary gear set and including a fourth, fifth, and sixth rotation elements, a third planetary gear set comprising a single pinion planetary gear set and including a seventh, eighth, and ninth rotation elements, and a fourth planetary gear set comprising a single pinion planetary gear set and including a tenth, eleventh, and twelfth rotation elements, a first rotating shaft including the first rotation element and the fifth rotation element and directly connected to the input shaft to be continuously operated as an input element, a second rotating shaft including the second rotation element and selectively connected to the transmission housing, a third rotating shaft including the third rotation element and the eighth rotation element and selectively connected to the second rotating shaft, a fourth rotating shaft including the fourth rotation element, the ninth rotation element, and the tenth rotation element and selectively connected to the second rotating shaft, a fifth rotating shaft including the sixth rotation element, a sixth rotating shaft including the seventh rotation element and selectively connected to the transmission housing, a seventh rotating shaft including the eleventh rotation element and selectively connected to the fifth rotating shaft and simultaneously and directly to the output shaft, an eighth rotating shaft including the twelfth rotation element and selectively connected to the transmission housing, a first clutch selectively connecting the fifth rotating shaft and the seventh rotating shaft, a second clutch selectively connecting the second rotating shaft and the third rotating shaft, a third clutch selectively connecting the second rotating shaft and the fourth rotating shaft, a first brake selectively connecting the second rotating shaft and the transmission housing, a second brake selectively connecting the sixth rotating shaft and the transmission housing, and a third brake selectively connecting the eighth rotating shaft and the transmission housing.

The first planetary gear set may include the first rotation element being a first sun gear, the second rotation element being a first planetary carrier, and the third rotation element being a first ring gear, the second planetary gear set may include the fourth rotation element being a second sun gear, the fifth rotation element being a second planetary carrier, and the sixth rotation element being a second ring gear, the third planetary gear set may include the seventh rotation element being a third sun gear, the eighth rotation element being a third planetary carrier, and the ninth rotation element being a third ring gear, and the fourth planetary gear set may include the tenth rotation element being a fourth sun gear, the eleventh rotation element being a fourth planetary carrier, and the twelfth rotation element being a fourth ring gear.

The planetary gear train according to various embodiments of the present invention may implement the gear shift stages for nine forward speed stages and one reverse speed stage by combining four planetary gear sets with the six control elements.

In addition, a span of a gear shift ratio is 9.0 or more, thereby maximizing driving efficiency of the engine.

In addition, the linearity of the interstage ratio of the shift stage is secured while multi-staging the shift stage at high efficiency, thereby making it possible to improve drivability such as acceleration before and after the shift, an engine speed rhythmic sense, and the like.

Further, effects that can be obtained or expected from various embodiments of the present invention are directly or suggestively described in the following detailed description. That is, various effects expected from exemplary embodiments of the present invention will be described in the following detailed description.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation table for each of transmission steps of respective control elements applied to the planetary gear train according to the first exemplary embodiment of the present invention.

Figure 1:
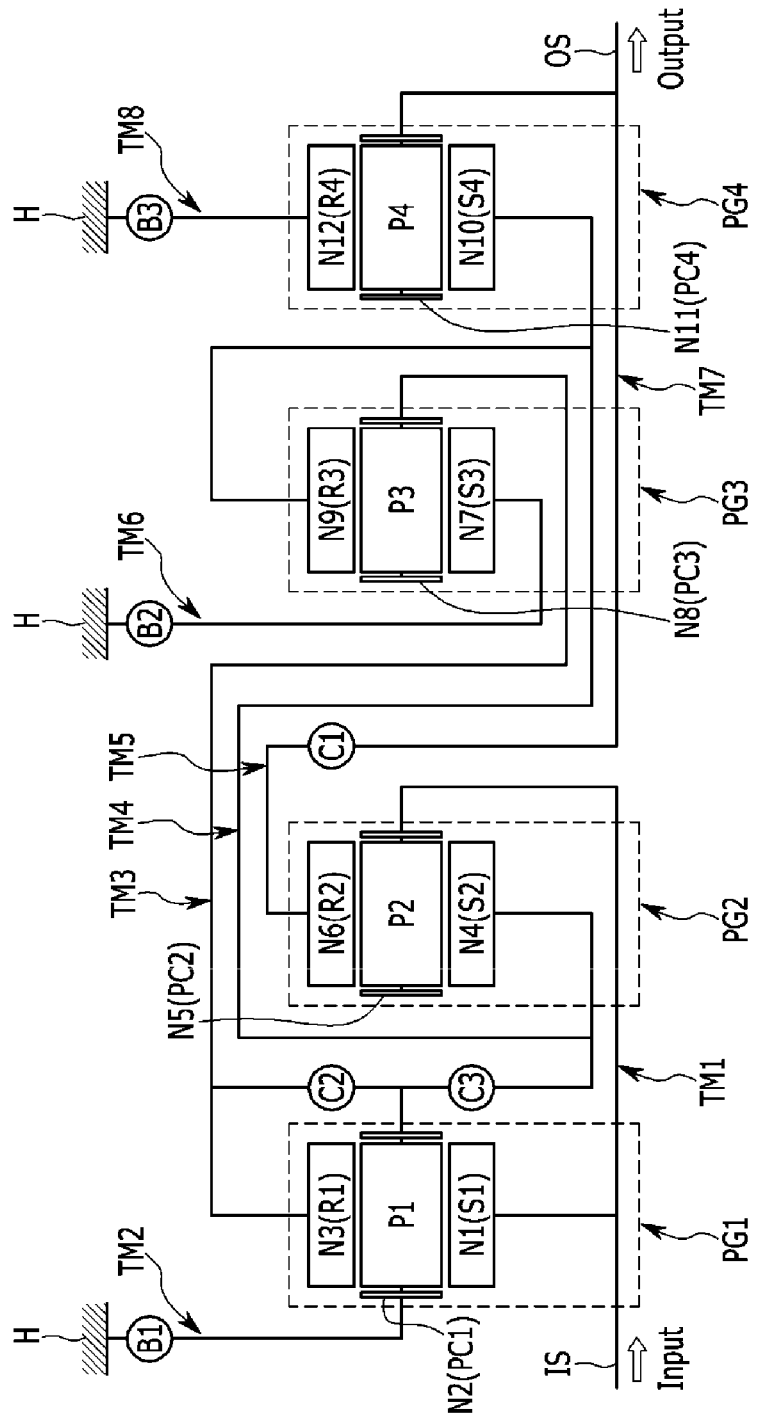
FIG. 1 is a configuration diagram of a planetary gear train according to a first exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a configuration diagram of a planetary gear train according to various embodiments of the present invention.

Referring to FIG. 1, the planetary gear train according to various embodiments of the present invention includes first, second, third, fourth planetary gear sets PG1, PG2, PG3, and PG4 disposed on the same axis, an input shaft IS, an output shaft OS, eight rotation shafts TM1 to TM8 directly connecting to each other through respective rotation elements of the first, second, third, and fourth planetary gear sets PG1, PG2, PG3, and PG4, six control elements C1-C3 and B1-B3, and a transmission housing H.

As a result, torque input from the input shaft IS is transmitted by an inter-complementation operation of the first, second, third, and fourth planetary gear sets PG1, PG2, PG3, and PG4 to be output through the output shaft OS.

The respective simple planetary gear sets are disposed in a sequence of the first, second, third, and fourth planetary gear sets PG1, PG2, PG3, and PG4 from an engine side.

The input shaft IS is an input member, and rotational power from a crankshaft of an engine is torque-converted through a torque converter to be input into the input shaft IS.

The output shaft OS is an output member, is disposed on the same axis as the input shaft IS, and transfers transmitted driving torque to a driving shaft through a differential apparatus.

The first planetary gear set PG1 is a single pinion planetary gear set, and includes rotation elements including a first sun gear S1 which is a first rotation element N1, a first planet carrier PC1 which is a second rotation element N2 for supporting a first pinion P1 that externally engages with the first sun gear S1 that is the first rotation element N1, and a first ring gear R1 which is a third rotation element N3 that internally engages with the first pinion P1.

The second planetary gear set PG2 is a single pinion planetary gear set, and includes a second sun gear S2 which is a fourth rotation element N4, a second planet carrier PC2 which is a fifth rotation element N5 for supporting a second pinion P2 that externally engages with the second sun gear S2 that is the fourth rotation element N4, and a second ring gear R2 which is a sixth rotation element N6 that internally engages with the second pinion P2.

The third planetary gear set PG3 is a single pinion planetary gear set, and includes a third sun gear S3 which is a seventh rotation element N7, a third planet carrier PC3 which is an eighth rotation element N8 for supporting a third pinion P3 that externally engages with the third sun gear S3 that is the seventh rotation element N7, and a third ring gear R3 which is a ninth rotation element N9 that internally engages with the third pinion P3.

The fourth planetary gear set PG4 is a single pinion planetary gear set and includes a fourth sun gear S4 which is a tenth rotation element N10, a fourth planet carrier PC4 which is an eleventh rotation element N11 for supporting a fourth pinion P4 that externally engages with the fourth sun gear S4 that is the tenth rotation element N10, and a fourth ring gear R4 which is a twelfth rotation element N12 that internally engages with the fourth pinion P4.

The first, second, third, and fourth planetary gear sets PG1, PG2, PG3, and PG4 are operated while retaining the total of eight rotating shafts TM1 to TM8 in a state in which the first rotation element N1 is directly connected to the sixth rotation element N6, the third rotation element N3 is directly connected to the eighth rotation element N8, and the fourth rotation element N4 is directly connected to the ninth rotation element N9 and the tenth rotation element N10.

The configurations of the eight rotating shafts TM1 to TM8 will be described below.

The first rotating shaft TM1 includes the first rotation element N1 (the first sun gear S1) and the fifth rotation element N5 (the second planet carrier PC2), and is directly connected with the input shaft IS so as to be continuously operated as an input element.

The second rotating shaft TM2 includes a second rotation element N2 (a first planetary carrier PC1) and is selectively connected to the transmission housing H.

The third rotating shaft TM3 includes a third rotation element N3 (a first ring gear R1) and an eighth rotation element N8 (a third planetary carrier PC3) and is selectively connected to the second rotating shaft TM2.

The fourth rotating shaft TM4 includes a fourth rotation element N4 (a second sun gear N2), a ninth rotation element N9 (a third ring gear R3), and a tenth rotation element N10 (a fourth sun gear S4) and is selectively connected to the second rotating shaft TM2.

The fifth rotating shaft TM5 includes a sixth rotation element N6 (a second ring gear R2).

The sixth rotating shaft TM6 includes a seventh rotation element N7 (a third sun gear S3) and is selectively connected to the transmission housing H.

The seventh rotating shaft TM7 includes an eleventh rotation element N11 (a fourth planetary carrier PC4) and is selectively connected to the fifth rotating shaft TM5 and simultaneously is directly connected to the output shaft OS so as to be continuously operated as an output element.

The eighth rotating shaft TM8 includes a twelfth rotation element N12 (a fourth ring gear R4) and is selectively connected to the transmission housing H.

Further, three clutches C1, C2, and C3, which are control elements, are disposed at portions where the rotating shafts of the rotating shafts TM1 to TM8 are selectively connected to each other.

In addition, three brakes B1, B2, and B3, which are control elements, are disposed at portions where the rotating shafts of the rotating shafts TM1 to TM8 are selectively connected with the transmission housing H.

The arrangement positions of the six control elements C1-C3 and B1-B3 will be described below.

The first clutch C1 is disposed between the fifth rotating shaft TM5 and the seventh rotating shaft TM7 to selectively integrate the seventh rotating shaft TM7 and the seventh rotating shaft TM7 to each other.

The second clutch C2 is disposed between the second rotating shaft TM2 and the third rotating shaft TM3 to selectively integrate the second rotating shaft TM2 and the third rotating shaft TM3 to each other.

The third clutch C3 is interposed between the second rotating shaft TM2 and the fourth rotating shaft TM4 to selectively integrate the second rotating shaft TM2 and the fourth rotating shaft TM4 to each other.

The first brake B1 is interposed between the second rotating shaft TM2 and the transmission housing H to selectively operate the second rotating shaft TM2 as a fixing element.

The second brake B2 is interposed between the sixth rotating shaft TM6 and the transmission housing H to selectively operate the sixth rotating shaft TM6 as a fixing element.

The third brake B3 is interposed between the eighth rotating shaft TM8 and the transmission housing H to selectively operate the eighth rotating shaft TM8 as a fixing element.

The control elements, which include the first, second, and third clutches C1, C2, and C3 and the first, second, and third brakes B1, B2, and B3 as described above, may be a multi-plate hydraulic frictional coupling unit that is frictionally coupled by hydraulic pressure.

FIG. 2 is a table representing operations at respective gear shift stages implemented by respective control elements applied to the planetary gear train according to various embodiments of the present invention.

As shown in FIG. 2, the planetary gear train according to various embodiments of the present invention is shifted while three control elements are operated in each shift stage.

At the first forward speed stage D1, the third clutch C3 and the second and third brakes B2 and B3 are simultaneously operated. Therefore, in a state in which the second rotating shaft TM2 is connected to the fourth rotating shaft TM4 to each other by the operation of the third clutch C3, the power is inputted to the first rotating shaft TM2, while the sixth rotating shaft TM6 and the eighth rotating shaft TM8 are operated as a fixing element by the operation of the second and third brakes B2 and B3, the first forward speed is realized and the power is output through the output shaft OS including the seventh rotating shaft TM7.

At the second forward speed stage D2, the second and third clutches C2 and C3 and the third brake B3 are simultaneously operated. Therefore, in a state in which the second rotating shaft TM2 is connected to the third and fourth rotating shafts TM3 and TM4 to each other by the operation of the second and third clutched C2 and C3, the power is inputted to the first rotating shaft TM1, while the eighth rotating shaft TM8 is operated as a fixing element by the operation of the third brake B3, the second forward speed is realized and the power is output through the output shaft OS including the seventh rotating shaft TM7.

At the third forward speed stage D3, the second clutch C2 and the second and third brakes B2 and B3 are simultaneously operated. Therefore, in a state in which the second rotating shaft TM2 is connected to the fourth rotating shaft TM4 to each other by the operation of the second clutch C2, the power is inputted to the first rotating shaft TM2, while the sixth rotating shaft TM6 and the eighth rotating shaft TM8 are operated as a fixing element by the operation of the second and third brakes B2 and B3, the third forward speed and the power is output through the output shaft OS including the seventh rotating shaft TM7.

At the fourth forward speed stage D4, the first clutch C1 and the second and third brakes B2 and B3 are simultaneously operated. Therefore, in a stage in which the fifth rotating shaft TM5 is connected to the seventh rotating shaft TM7 to each other by the operation of the first clutch C1, the power is inputted to the first rotating shaft TM2, while the sixth rotating shaft TM6 and the eighth rotating shaft TM8 are operated as a fixing element by the operation of the second and third brakes B2 and B3, the fourth forward speed is realized and the power is outputted through the output shaft OS including the seventh rotating shaft TM7.

At the fifth forward speed stage D5, the first and second clutches C1 and C2 and the second brake B2 are simultaneously operated. Therefore, in a state in which the fifth rotating shaft TM5 is connected to the seventh rotating shaft TM7 by the operation of the first clutch C1 and the second rotating shaft TM2 is connected to the third rotating shaft TM3 to each other by the operation of the second clutch C2, while the sixth rotating shaft TM6 is operated as a fixing element by the operation of the second brake B2, the fifth forward speed is realized and the power is output through the output shaft OS including the seventh rotating shaft TM7.

At the sixth forward speed stage D6, the first, second, and third clutch C1, C2, and C3 are simultaneously operated. Therefore, as the fifth rotating shaft TM5 is connected to the seventh rotating shaft TM7 to each other by the operation of the first clutch C1, the second rotating shaft TM2 is connected to the third rotating shaft TM3 by the operation of the second clutch C2, and the second rotating shaft TM2 is connected to the fourth rotating shaft TM4 by the operation of the third clutch C3, while the first, second, third, and fourth planetary gear sets PG1, PG2, PG3, and PG4 are all connected in parallel, the sixth forward speed in which the input power is output as it is realized and the power is output through the output shaft OS including the seventh rotating shaft TM7.

At the seventh forward speed stage D7, the first and third clutches C1 and C3 and the second brake B2 are simultaneously operated. Therefore, in a state in which the fifth rotating shaft TM5 is connected to the seventh rotating shaft TM7 by the operation of the first clutch C1 and the second rotating shaft TM2 is connected to the fourth rotating shaft TM4 to each other by the operation of the third clutch C3, while the sixth rotating shaft TM6 is operated as a fixing element by the operation of the second brake B2, the seventh forward is realized and the power is output through the output shaft OS including the seventh rotating shaft TM7.

At the eighth forward speed stage D8, the first and third clutches C1 and C3 and the first brake B1 are simultaneously operated. Therefore, in a state in which the fifth rotating shaft TM5 is connected to the seventh rotating shaft TM7 to each other by the operation of the first clutch C1 and the second rotating shaft TM2 is connected to the fourth rotating shaft TM4 to each other by the operation of the third clutch C3, while the second rotating shaft TM2 is operated as a fixing element by the operation of the first brake B1, the eighth forward speed is realized and the power is output through the output shaft OS including the seventh rotating shaft TM7.

At the ninth forward speed stage D9, the first clutch C1 and the first and second brakes B1 and B2 are simultaneously operated. Therefore, in a state in which the fifth rotating shaft TM5 is connected to the seventh rotating shaft TM7 to each other by the operation of the first clutch C1, while the second rotating shaft TM2 and the sixth rotating shaft TM6 are operated as a fixing element by the operation of the first and second brakes B1 and B2, the ninth forward speed is realized and the power is outputted through the output shaft OS including the seventh rotating shaft TM7.

At the reverse speed state REV, the first, second, and third brakes B1, B2, and B3 are simultaneously operated. Therefore, in a state in which the power is inputted to the second rotating shaft TM2, while the second, sixth, and eighth rotating shafts TM2, TM6, and TM8 are operated as a fixing element by the operation of the first, second, and third brakes B1, B2, and B3, the reverse speed is realized and the power is outputted through the output shaft OS including the seventh rotating shaft TM7.

The planetary gear train according to various embodiments of the present invention may implement the gear shift stages for nine forward speed stages and one reverse speed stage by operating and controlling the four planetary gear sets PG1, PG2, PG3, and PG4 using the three clutches C1, C2, and C3 and the three brakes B1, B2, and B3.

In addition, all ratios between the speed stages are 1.2 or more except for 6/7 and 7/8 forward speed stages, while ensuring linearity, thereby improving drivability such as acceleration before and after the gear shift operations, and a sense of rhythm of an engine speed.

In addition, a span of a gear shift ratio is 9.0 or more, thereby maximizing driving efficiency of the engine.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle comprising:
    an input shaft receiving power of an engine;
    an output shaft configured to output shifted power;
    a first planetary gear set including first, second, and third rotation elements;
    a second planetary gear set including fourth, fifth, and sixth rotation elements;
    a third planetary gear set including seventh, eighth, and ninth rotation elements;
    a fourth planetary gear set including tenth, eleventh, and twelfth rotation elements; and
    six control elements, each of which selectively interconnects a corresponding pair of the input shaft, the output shaft, the first to twelfth rotation elements, and a transmission housing,
    wherein the input shaft is continuously connected with the first rotation element,
    the output shaft is continuously connected to the eleventh rotation element,
    the first rotation element is continuously connected to the fifth rotation element,
    the third rotation element is continuously connected to the eighth rotation element,
    the fourth rotation element is continuously connected to the ninth rotation element,
    the fourth rotation element is continuously connected to the tenth rotation element,
    the second rotation element is selectively connected to the transmission housing, and
    three control elements of the six control elements are operated for respective shift stages,
    wherein, the seventh rotation element is selectively connected to the transmission housing,
    wherein, the twelfth rotation element is selectively connected to the transmission housing,
    wherein, the output shaft is selectively connected to the sixth rotation element,
    wherein, the third rotation element is selectively connected to the second rotation element, such that the third and second rotation elements rotate at a same speed when connected, and
    wherein, the fourth rotation element is selectively connected to the second rotation element.

2. The planetary gear train of claim 1, wherein:
    the first, second, and third rotation elements of the first planetary gear set are a sun gear, a planetary carrier, and a ring gear, respectively,
    the fourth, fifth, and sixth rotation elements are a sun gear, a planetary carrier, and a ring gear,
    the seventh, eighth, and ninth rotation elements are a sun gear, a planetary carrier, and a ring gear, respectively, and
    the tenth, eleventh, and twelfth rotation elements are a sun gear, a planetary carrier, and a ring gear, respectively.

3. A planetary gear train of an automatic transmission for vehicles comprising:
    an input shaft receiving power of an engine;
    an output shaft configured to output shifted power;
    a first planetary gear set including first, second, and third rotation elements;
    a second planetary gear set including fourth, fifth, and sixth rotation elements;
    a third planetary gear set including seventh, eighth, and ninth rotation elements;
    a fourth planetary gear set including tenth, eleventh, and twelfth rotation elements;

six control elements, each of which selectively interconnects a corresponding pair of the input shaft, the output shaft, the first to twelfth rotation elements, and a transmission housing;

a first rotating shaft including the first rotation element and the fifth rotation element and directly connected to the input shaft to be continuously operated as an input element;

a second rotating shaft including the second rotation element and selectively connected to the transmission housing;

a third rotating shaft including the third rotation element and the eighth rotation element and selectively connected to the second rotating shaft;

a fourth rotating shaft including the fourth rotation element, the ninth rotation element, and the tenth rotation element and selectively connected to the second rotating shaft;

a fifth rotating shaft including the sixth rotation element;

a sixth rotating shaft including the seventh rotation element and selectively connected to the transmission housing;

a seventh rotating shaft including the eleventh rotation element and selectively connected to the fifth rotating shaft and simultaneously and directly connected to the output shaft; and an eighth rotating shaft including the twelfth rotation element and selectively connected to the transmission housing.

4. The planetary gear train of claim 3, wherein:

the first planetary gear set is a single-pinion planetary gear set, in which the first rotation element is a first sun gear, the second rotation element is a first planet carrier, and the third rotation element is a first ring gear, the second planetary gear set is a single-pinion planetary gear set, in which the fourth rotation element is a second sun gear, the fifth rotation element is a second planet carrier, and the sixth rotation element is a second ring gear, the third planetary gear set is a single-pinion planetary gear set, in which the seventh rotation element is a third sun gear, the eighth rotation element is a third planet carrier, and the ninth rotation element is a third ring gear, and, the fourth planetary gear set is a single-pinion planetary gear set, the tenth rotation element is a fourth sun gear, the eleventh rotation element is a fourth planet carrier, and the twelfth rotation element is a fourth ring gear.

5. The planetary gear train of claim 3, wherein the six control elements include a first clutch selectively connecting the fifth rotating shaft and the seventh rotating shaft;

a second clutch selectively connecting the second rotating shaft and the third rotating shaft;

a third clutch selectively connecting the second rotating shaft and the fourth rotating shaft;

a first brake selectively connecting the second rotating shaft and the transmission housing;

a second brake selectively connecting the sixth rotating shaft and the transmission housing; and a third brake selectively connecting the eighth rotating shaft and the transmission housing.

6. The planetary gear train of claim 5, wherein speed stages realized by selective operation of the six control elements include:

a first forward speed stage by the simultaneous operation of the third clutch and the second, third brake;

a second forward speed stage by the simultaneous operation of the second and third clutches and the third brake;

a third forward speed stage by the simultaneous operation of the second clutch and the second and third brakes;

a fourth forward speed stage by the simultaneous operation of the first clutch and the second and third brakes;

a fifth forward speed stage by the simultaneous operation of the first and second clutches and the second brake;

a sixth forward speed stage by the simultaneous operation of the first, second, and third clutches;

a seventh forward speed stage by the simultaneous operation of the first and third clutches and the second brake;

an eighth forward speed stage by the simultaneous operation of the first and third clutches and the first brake;

a ninth forward speed stage by the simultaneous operation of the first clutch and the first and second brakes; and a reverse speed stage by the simultaneous operation of the first, second, and third brakes.

7. A planetary gear train of an automatic transmission for vehicles comprising:

an input shaft receiving power of an engine;

an output shaft configured to output shifted power;

a first planetary gear set comprising a single pinion planetary gear set and including a first, second, and third rotation elements;

a second planetary gear set comprising a single pinion planetary gear set and including a fourth, fifth, and sixth rotation elements;

a third planetary gear set comprising a single pinion planetary gear set and including a seventh, eighth, and ninth rotation elements; and a fourth planetary gear set comprising a single pinion planetary gear set and including a tenth, eleventh, and twelfth rotation elements, a first rotating shaft including the first rotation element and the fifth rotation element and directly connected to the input shaft to be continuously operated as an input element;

a second rotating shaft including the second rotation element and selectively connected to the transmission housing;

a third rotating shaft including the third rotation element and the eighth rotation element and selectively connected to the second rotating shaft;

a fourth rotating shaft including the fourth rotation element, the ninth rotation element, and the tenth rotation element and selectively connected to the second rotating shaft;

a fifth rotating shaft including the sixth rotation element;

a sixth rotating shaft including the seventh rotation element and selectively connected to the transmission housing;

a seventh rotating shaft including the eleventh rotation element and selectively connected to the fifth rotating shaft and simultaneously and directly to the output shaft;

an eighth rotating shaft including the twelfth rotation element and selectively connected to the transmission housing;

a first clutch selectively connecting the fifth rotating shaft and the seventh rotating shaft;

a second clutch selectively connecting the second rotating shaft and the third rotating shaft;

a third clutch selectively connecting the second rotating shaft and the fourth rotating shaft;

a first brake selectively connecting the second rotating shaft and the transmission housing;
a second brake selectively connecting the sixth rotating shaft and the transmission housing; and
a third brake selectively connecting the eighth rotating shaft and the transmission housing.

8. The planetary gear train of claim 7, wherein:
the first planetary gear set includes the first rotation element comprising a first sun gear, the second rotation element comprising a first planetary carrier, and the third rotation element comprising a first ring gear,
the second planetary gear set includes the fourth rotation element comprising a second sun gear, the fifth rotation element comprising a second planetary carrier, and the sixth rotation element comprising a second ring gear,
the third planetary gear set includes the seventh rotation element comprising a third sun gear, the eighth rotation element comprising a third planetary carrier, and the ninth rotation element comprising a third ring gear, and
the fourth planetary gear set includes the tenth rotation element comprising a fourth sun gear, the eleventh rotation element comprising a fourth planetary carrier, and the twelfth rotation element comprising a fourth ring gear.

9. The planetary gear train of claim 7, wherein speed stages realized by the selective operation of three clutches and three brakes include:
a first forward speed stage by the simultaneous operation of the third clutch and the second, third brake;
a second forward speed stage by the simultaneous operation of the second and third clutches and the third brake;
a third forward speed stage by the simultaneous operation of the second clutch and the second and third brakes;
a fourth forward speed stage by the simultaneous operation of the first clutch and the second and third brakes;
a fifth forward speed stage by the simultaneous operation of the first and second clutches and the second brake;
a sixth forward speed stage by the simultaneous operation of the first, second, and third clutches;
a seventh forward speed stage by the simultaneous operation of the first and third clutches and the second brake;
an eighth forward speed stage by the simultaneous operation of the first and third clutches and the first brake;
a ninth forward speed stage by the simultaneous operation of the first clutch and the first and second brakes; and
a reverse speed stage by the simultaneous operation of the first, second, and third brakes.

* * * * *